Jan. 21, 1941.  S. Q. SHANNON  2,229,477

RING ORIENTING MACHINE

Filed Jan. 15, 1940

S. Q. Shannon
INVENTOR.

BY *Miner L. Hartmann*
ATTORNEY.

Patented Jan. 21, 1941

2,229,477

UNITED STATES PATENT OFFICE 2,229,477

RING ORIENTING MACHINE

S. Q. Shannon, Los Angeles, Calif.

Application January 15, 1940, Serial No. 313,952

8 Claims. (Cl. 29—1)

This invention relates to a machine for orienting out-of-round rings and disks, particularly out-of-round piston ring castings.

In making piston rings, it is common practice to cast a metal ring which is not a true circle, but is substantially the shape produced by opening a circular ring at one place, forcing its ends apart at the opening and inserting a short segment which is substantially straight or of larger curvature than the ring. The castings for rings are made in this shape; subsequently the piece corresponding to the "inserted" segment, is actually cut out, leaving an open ring whose ends must be compressed together to form a true circle. Various means of marking the castings to show the position of the segment to be removed are employed, but visual-manual orientation of the rings requires much time, and even if marked, these markings may become obliterated or are defective.

The object of this invention is to provide a machine to quickly and effectively locate the position of the segment to be cut out, without reference to any visual marks, notches or scratches. Another object is to provide a machine which will orient each ring in a group of rings so that the position of the segment to be removed will be aligned so that the group of rings may be machined or cut as one unit. Another object is to provide a simple machine for orienting an out-of-round ring or disk. These and other objects will be apparent from the following description and drawing in which Fig. 1 is a plan view of one form of my ring orienting machine;

Figure 1:
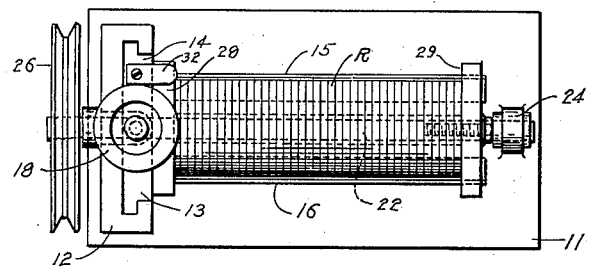
Figures 2, 3:
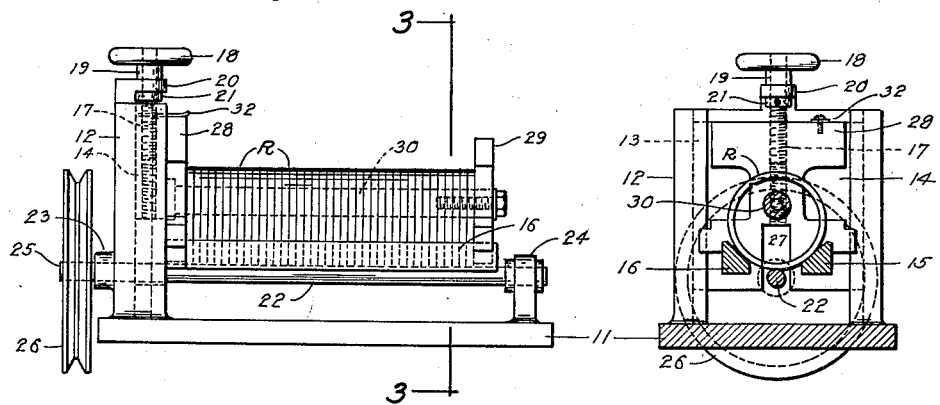
Fig. 2 is an elevation view of the same.
Fig. 3 is a cross-sectional view taken on the line 3—3 of Fig. 2.

In the figures, the base-plate 11 has mounted thereon an upright member 12 which is provided with a broad T-shaped groove 13 on one face, in which groove is a vertically sliding member 14, from whose lower end portion project parallel horizontal bars 15 and 16. The vertical position of the sliding member 14 is adjustable by means of the screw 17 which may be turned by the attached hand wheel 18, the upper end of the screw being adapted to rotate in the bracket 20 affixed to the upright member 12, with the hub 19 of the wheel and the attached collar 21 holding the screw in the bracket.

Intermediate the horizontal bars 15 and 16, is a roller 22 mounted upon bearing 23 attached to the upright member 12, and upon another bearing 24 mounted on the base plate 11. An extension of the roller shaft 25 supports a drive pulley 26 by means of which the roller 22 is rotated. An opening 27 is provided in the sliding member 14 so that it will not interfere with the roller 22.

A clamping fixture consisting of end pieces 28 and 29 resting upon the horizontal bars 15 and 16, and a center bar 30 with threaded means for drawing the heads 28 and 29 together against a stack of rings R between them, is provided, the spring clip 32 attached to the sliding member 14 serving to removably retain the end piece 28 while the rings are being oriented and unclamped.

The horizontal bars 15 and 16 are sufficiently rigid so that they maintain a parallel position with respect to the roller 22 even when supporting the weight of rings and clamp. The faces 33 of the bars upon which the rings are supported are preferably inclined planes at 35° to 45° from the horizontal, so that the machine may, if desired, be used for orienting varying sizes of rings by adjusting the vertical position of the roller relative to the supporting bars. Other shaped supporting bars may be used.

The machine may be used for orienting a single ring or a stack or group of rings of the same size, and after orienting all of the rings in a stack so that they are aligned endwise, they may be clamped together and held in that position by the clamping fixture, for subsequent manufacturing operations.

Figures 4, 5:
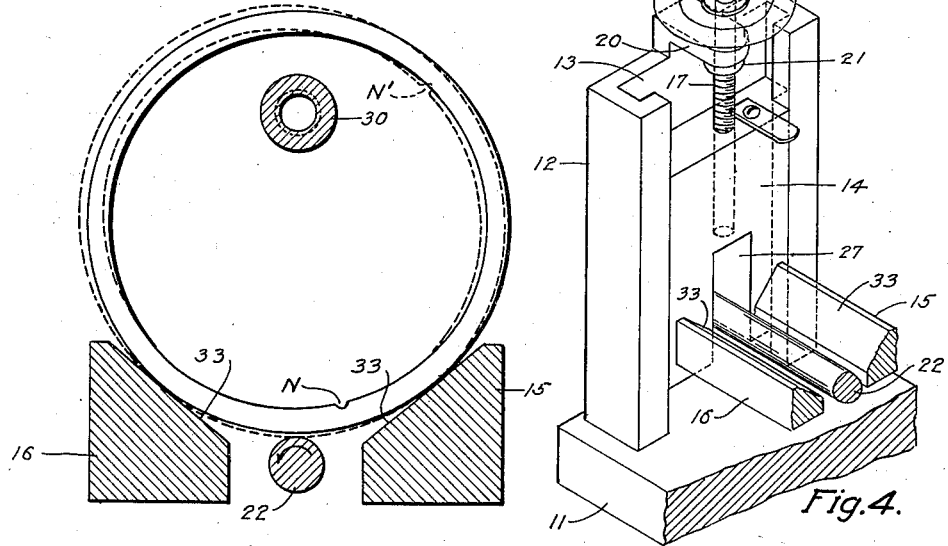
Fig. 4 is a perspective view showing a portion of the machine of Figs. 1, 2 and 3.
Fig. 5 is a diagrammatic view, in the nature of a cross-section of Fig. 2, showing the principle of operation of the machine.

For orienting piston ring castings, in which the out-of-roundness consists substantially in the inclusion of a somewhat flat segment, the operation consists in rotating the roller, placing a ring (or rings) upon the two horizontal supports, and adjusting the vertical position of the bars relative to the roller so that frictional driving contact is made with the periphery of the ring except at the portion of the periphery where the curvature is less than in the main portion. The ring (or rings) then rotates by sliding on one or both of the faces 33 of the horizontal bars 15 and 16 until the curvature becomes less and the roller no longer makes driving frictional contact and the ring stops rotating. The position of the ring in oriented position is shown in solid lines in the diagram of Fig. 5, the notch N, (which is now sometimes used to indicate the middle of the segment which is to be removed) being included to indicate the flat portion of the curve, while the ring in position to be rotated by the revolving roller is shown in broken lines with the notch at N'. The procedure, of course, may be varied for other out-of-round shapes than those described in the particular case of piston ring castings.

The roller is provided with suitable surface roughness or surface coatings to give the necessary driving friction when contacting the ring peripheries. With rough-ground castings, I have found that simple longitudinal fine grooving or knurling is satisfactory, but rubber or other frictional surfaces on the roller may be provided as required.

While I have described a preferred embodiment of my machine, I do not wish to limit myself to the particular form shown, but restrict my invention only insofar as required by the prior art and the spirit of the appended claims.

I claim:

1. An out-of-round ring orienting machine comprising bearing edges for supporting a ring on its peripheral surface, means adapted to rotate said ring by frictional contact with its peripheral surface, adjustable means for positioning said rotating means relative to the out-of-round peripheral surface so that no frictional contact is made with a selected segment of the ring's periphery.

2. An out-of-round ring orienting machine comprising bearing edges for supporting a ring on its peripheral surface, rotary means adapted for turning said ring by frictional contact with its peripheral surface said means being positioned relative to the out-of-round ring so that no frictional contact is made with one segment of the ring's periphery.

3. An out-of-round ring orienting machine comprising a pair of bars adapted to support a ring on its peripheral surface, a rotatable roller disposed adacent said bars and in position to frictionally engage the peripheral surface of an out-of-round ring in all portions except those of minimum curvature.

4. An out-of-round ring orienting machine comprising two spaced apart parallel horizontal bars adapted to support a plurality of similar rings on their peripheral surfaces, an elongated roller disposed between said bars and below the peripheries of the rings, and means for raising and lowering the position of said supporting bars relative to said roller.

5. An out-of-round ring orienting machine comprising two spaced apart parallel supporting bars having opposed plane-surfaced sides inclined at approximately forty-five degrees from horizontal and ninety degrees from each other, a roller having its axis parallel to said surfaced sides disposed intermediate said bars, means for rotating said roller, and means for adjusting the vertical position of said bars relative to said roller.

6. An out-of-round ring orienting machine comprising two spaced apart parallel horizontal bars adapted to support a plurality of similar rings on their peripheral surfaces, and a roller disposed between said bars and below the rings for frictionally contacting the periphery of each ring except when that ring is positioned with its zone of minimum curvature adjacent said roller.

7. An out-of-round ring orienting machine comprising two spaced apart parallel horizontal bars adapted to support a plurality of similar rings on their peripheral surfaces, a removable fixture having two end plates resting upon said horizontal bars adapted to loosely hold between them the rings to be oriented, an elongated roller disposed between said bars and below the peripheries of the rings, means for rotating said roller, and means for raising and lowering the vertical position of said supporting bars relative to said roller so that said roller when rotating frictionally engages the periphery of each ring except when a ring is oriented with its portion of minimum curvature adjacent said roller, and means for clamping the end plates of said fixture against the rings to hold them in aligned position after each ring has been rolled into position where its periphery no longer engages said roller.

8. An out-of-round ring orienting machine comprising two spaced apart parallel horizontal bars adapted to support a plurality of similar rings on their peripheral surfaces, an elongated roller disposed between said bars and below the peripheries of the rings, means for raising and lowering the position of said supporting bars relative to said roller, and means removably supported on said bars for holding said rings in upright position while being oriented and for clamping the rings in aligned position after orientation of all of the rings.

S. Q. SHANNON.